US012194771B2

(12) United States Patent
Patel

(10) Patent No.: US 12,194,771 B2
(45) Date of Patent: Jan. 14, 2025

(54) DUAL-COLOR SHIFT SECURITY FILM

(71) Applicant: Shilpan Pravinchandra Patel, Mumbai (IN)

(72) Inventor: Shilpan Pravinchandra Patel, Mumbai (IN)

( * ) Notice: Subject to any disclaimer, the term of this patent is extended or adjusted under 35 U.S.C. 154(b) by 0 days.

(21) Appl. No.: 18/005,911

(22) PCT Filed: Jul. 19, 2021

(86) PCT No.: PCT/IN2021/050697
§ 371 (c)(1),
(2) Date: Jan. 18, 2023

(87) PCT Pub. No.: WO2022/018752
PCT Pub. Date: Jan. 27, 2022

(65) Prior Publication Data

US 2023/0286313 A1 Sep. 14, 2023

(30) Foreign Application Priority Data

Jul. 19, 2020 (IN) ............................ 202021011994

(51) Int. Cl.
*B42D 25/364* (2014.01)
*B42D 25/47* (2014.01)

(52) U.S. Cl.
CPC ........... *B42D 25/364* (2014.10); *B42D 25/47* (2014.10)

(58) Field of Classification Search
CPC ....... B42D 25/364; B42D 25/47; B42D 25/45
USPC ................................ 283/67, 72, 94, 98, 901
See application file for complete search history.

(56) References Cited

U.S. PATENT DOCUMENTS

2010/0270379 A1* 10/2010 Lister ..................... B42D 25/29 235/487
2021/0031553 A1* 2/2021 Brehm ................. B42D 25/373

FOREIGN PATENT DOCUMENTS

| | | | |
|---|---|---|---|
| CN | 208298458 U | 12/2018 | |
| CN | 111098620 A | 5/2020 | |
| DE | 102018103236 | 8/2019 | |
| DE | 102018103236 A1 * | 8/2019 | B42D 25/324 |
| GB | 2578117 | 4/2020 | |
| JP | 2007271808 A | 10/2007 | |

OTHER PUBLICATIONS

International Search Report mailed Oct. 12, 2021 (2 pages).
Examination Report/Office Action for corresponding Indian Patent Application No. 202021011994 dated Mar. 31, 2023.

* cited by examiner

*Primary Examiner* — Justin V Lewis
(74) *Attorney, Agent, or Firm* — Sandberg Phoenix & von Gontard PC

(57) ABSTRACT

The present invention provides a security film (100) with dual color shift characteristics, the security film (100) comprising a substrate layer (110) having a first substrate surface (112) and a second substrate surface (114), a first liquid crystal layer (120), including a first liquid crystalline material, disposed above the first substrate surface (112), and a second liquid crystal layer (130), including a second liquid crystalline material, disposed above the second substrate surface (114). The first liquid crystal layer (120) and the second liquid crystal layer (130) are adapted to exhibit dual color shifts, on rotation and/or translation of the security film (100). Also, a method (200) for manufacturing the security film (100) has also been provided.

7 Claims, 8 Drawing Sheets

DUAL-COLOR SHIFT SECURITY FILM

CROSS-REFERENCE TO RELATED APPLICATIONS

This application is the US National Stage under 35 USC § 371 of International Application No. PCT/IN2021/050697, filed Jul. 19, 2021 which claims priority to Indian Application No. 2020210994 filed Jul. 19, 2020, both of which are incorporated herein by reference.

TECHNICAL FIELD

The present invention relates to color shift film used as security elements for valuable documents. More particularly the present invention relates to enhanced security elements, such that the color shift film changes color with viewing angle and is capable of exhibiting plurality of colors or dual color effect to prevent counterfeiting. The present invention also relates to methods of manufacturing the enhanced security elements.

BACKGROUND ART

Valuable documents, such as banknotes, shares, bonds, certificates, vouchers, checks, some highly coveted admission tickets, but also other documents that are susceptible to counterfeiting, such as passports or other identification documents, are generally provided with various security elements to increase their resistance to counterfeiting. The security elements can be designed, for example, in the form of security threads embedded in a bill, or an applied security strip or a self-supporting transfer element which is applied to a document of value after its production.

There are several well-known designs of the security elements, in the current state of the art. Such security elements are generally designed with multilayer thin-film elements, with their color impressions changing for the viewer changes with varying viewing angles. Some of the examples may include transition from green to blue, from blue to magenta or from magenta to green, etc. Such security elements with color changes when tilting/rotating and or translating the security elements are referred to as color shift effect security elements.

Color-shift effects can be obtained by various means, for example using thin-film interference by means of structures for example which have a layer that reflects electromagnetic waves, a spacer layer and a layer formed from metallic clusters. Another way of obtaining a security element which has a color-shift effect is to use a coating consisting of liquid crystals, either in the form of a pigmented layer or a polymerized film.

Though color shift security film are already known in the prior art, there is still a need to provide improved color shift security film which have better complexity, such that the color shift film changes color with viewing angle and is capable of exhibiting plurality of colors or dual color effect to prevent counterfeiting.

SUMMARY

The primary object is to provide a security film with dual color shift characteristics.

Another object is to provide a security film with dual color shift characteristics that provides enhanced design complexity that facilitates enhanced protection against counterfeiting.

Yet another object is to provide a security film with dual color shift characteristics that exhibits plurality of colors or dual color effect to prevent counterfeiting.

Yet another object is to provide several technically and/or commercially advantageous embodiments of the security film with dual color shift characteristics.

Yet another object is to provide methods of manufacturing the security film with dual color shift characteristics.

According to a first aspect, there is provided a security film with dual color shift characteristics, the security film comprising a substrate layer having a first substrate surface and a second substrate surface, a first liquid crystal layer, including a first liquid crystalline material, disposed above the first substrate surface, and a second liquid crystal layer, including a second liquid crystalline material, disposed above the second substrate surface. The first liquid crystal layer and the second liquid crystal layer are adapted to exhibit distinct color shifts, on rotation and/or translation of the security film.

In one embodiment, the security film comprises a reflective coating between the first liquid crystal layer and the first substrate surface.

In one embodiment, the reflective coating includes a plurality of metalized zones and a plurality of demetalized zones.

According to a second aspect, there is provided a method for manufacturing a security film with dual color shift characteristics, the method comprising steps of providing a substrate layer having a first substrate surface and a second substrate surface, providing a first liquid crystal layer, including a first liquid crystalline material, above the first substrate surface, and providing a second liquid crystal layer, including a second liquid crystalline material, above the second substrate surface. The first liquid crystal layer and the second liquid crystal layer are adapted to exhibit dual color shifts, on rotation and/or translation of the security film.

In one embodiment, the method comprises a step of providing a reflective coating between the first liquid crystal layer and the first substrate surface.

In one embodiment, the reflective coating is made from a metallic material.

In one embodiment, the method comprises a step of demetalizing predetermined zones of the reflective coating, in accordance with predetermined indicia, to generate a plurality of metalized zones and a plurality of demetalized zones in the reflective coating.

In one embodiment, the manufacturing of the security film includes combining a first set of layers with a second set of layers, such that, the first set of layers includes the substrate layer, the reflective coating provided onto the first substrate surface, the reflective coating undergo drying process, and the first liquid crystal layer provided onto the reflective coating, and the second set of layers includes a second substrate layer having a third substrate surface and a fourth substrate surface, and the second liquid crystal layer provided onto the fourth substrate surface. The first set of layers and the second set of layers have been manufactured independently. The first set of layers is combined with the second set of layers by joining an exposed surface of the second liquid crystal layer to the second substrate surface, in a manner, that the third substrate surface is facing the ambient. Also, the second substrate layer is removed to yield the security film, after combining the first set of layers with the second set of layers.

In the context of the specification, the phrase "high security paper" refers to value documents such as bank notes, bonds, bills, internal organizational memorandums, circulars, confidential documents, passports or other identification documents that are usually provided with various security elements to ensure their integrity and increase the protection against forgery.

BRIEF DESCRIPTION OF DRAWINGS

So that the manner in which the above recited features of the present invention can be understood in detail, a more particular description of the security film and its method of manufacture, briefly summarized above, may have been referred by embodiments, some of which are illustrated in the appended drawings. It is to be noted, however, that the appended drawings illustrate only typical embodiments and are therefore not to be considered limiting of its scope, for the claimed invention may admit to other equally effective embodiments. These and other features, benefits, and advantages will become apparent by reference to the following figures, with like reference numbers referring to like structures across the views, wherein:

FIG. 11D illustrates a cross-sectional view of the security film of FIG. 1C;

DETAILED DESCRIPTION

Figure 1A:
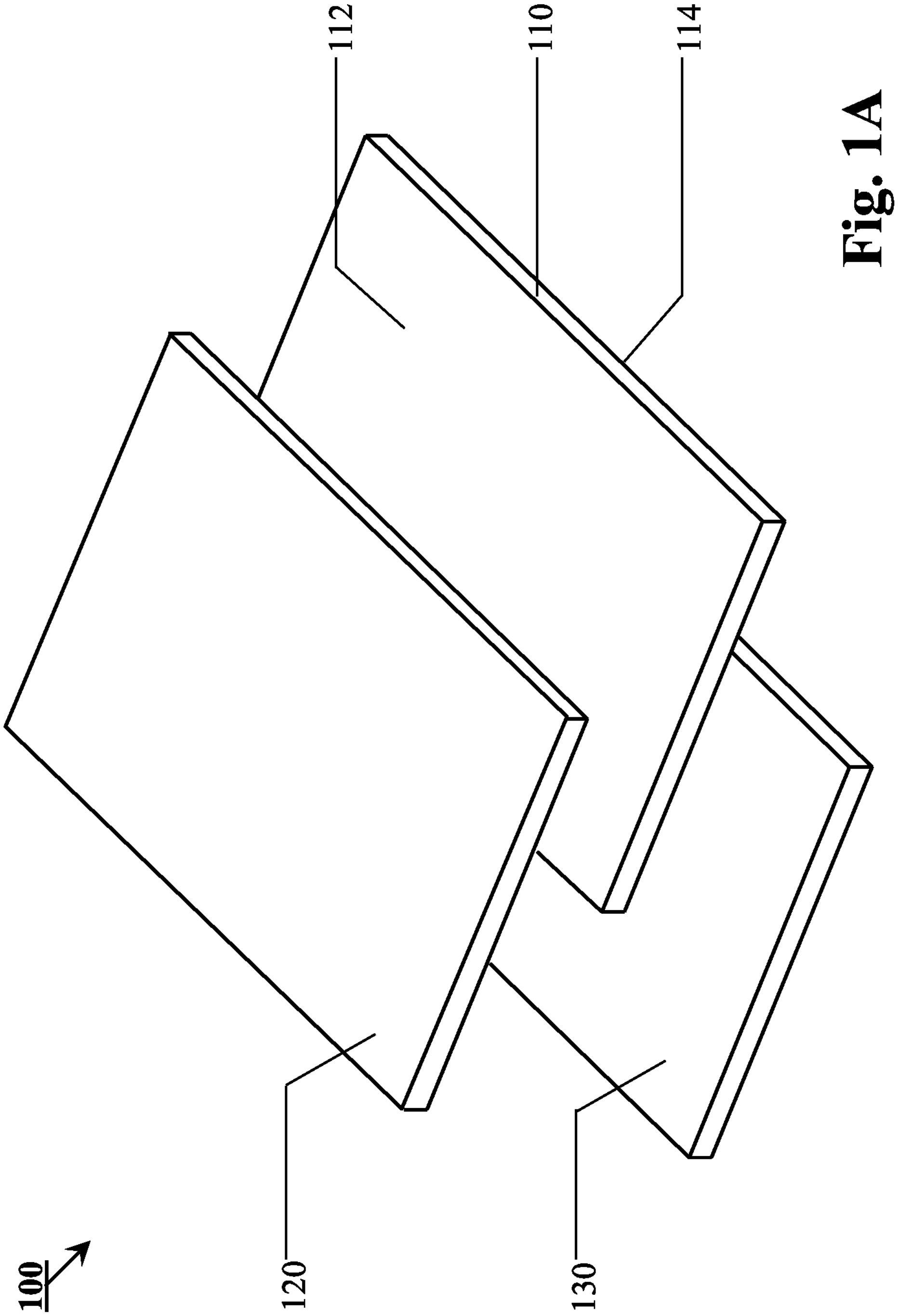
FIG. 1A illustrates an exploded view of a security film with dual color shift characteristics, in accordance with an embodiment of the present invention.

While the claimed invention is described herein by way of example using embodiments and illustrative drawings, those skilled in the art will recognize that the claimed invention is not limited to the embodiments of drawing or drawings described, and are not intended to represent the scale of the various components. Further, some components that may form a part of the claimed invention may not be illustrated in certain figures, for ease of illustration, and such omissions do not limit the embodiments outlined in any way. It should be understood that the drawings and detailed description thereto are not intended to limit the claimed invention to the particular form disclosed, but on the contrary, the claimed invention is to cover all modifications, equivalents, and alternatives falling within the scope of this description. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned.

Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the security film and its method of manufacture. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The security film and its method of manufacture are described hereinafter by various embodiments with reference to the accompanying drawing(s), wherein reference numerals used in the accompanying drawing(s) correspond to the like elements throughout the description. This security film and its method of manufacture may, however, be embodied in many different forms and should not be construed as limited to the embodiment set forth herein. Rather, the embodiment is provided so that this disclosure will be thorough and complete and will fully convey the scope of the security film and its method of manufacture to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the claimed invention.

Security films are disclosed which have at least two liquid crystal layers disposed on two opposing surfaces of a substrate, at least one liquid crystal layer on each one of the two opposing surfaces. The liquid crystal layers are envisaged to exhibit dual color shifts, thereby providing enhanced resilience to the security film against counterfeiting. The visibility of the color shifts of one or both of the two liquid crystal layer may be enhanced by use of reflective coatings provided between the substrate and the liquid crystal layers. Additional security features may be incorporated by, either through etching or through deposition of material, in form of predesigned indicia, such as logos, numerals, emblems and signatures etc., of or on the reflective coating.

Also disclosed are several embodiments of methods for manufacturing of the aforementioned security films. In that manner, the methods for manufacturing are disclosed to include layer by layer attachment of the several layers of the security films, joined with each other through adhesives and/or thermal curing. Moreover, the security film may be manufactured by attaching two or more sets of layers that have been manufactured independently, thereby imparting modularity and design flexibility to the security film. Referring to the drawings, the invention will now be described in more detail.

Figure 1B:
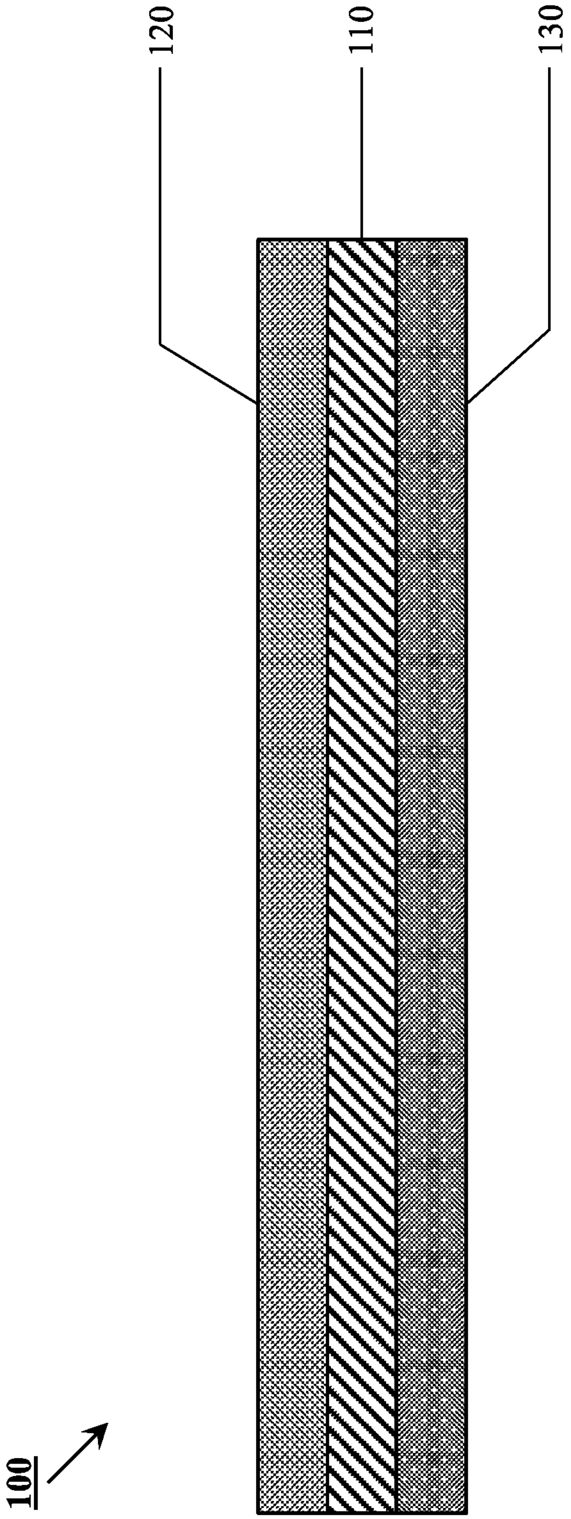
FIG. 1B illustrates a cross-sectional view of the security film of FIG. 1A.

FIG. 1A illustrates an exploded view of a security film 100 with dual color shift characteristics (hereinafter referred to as "the security film 100"). FIG. 1B illustrates a cross-sectional view of the security film 100 of FIG. 1A. As illustrated in FIGS. 1A and 1B, the security film 100 includes a substrate layer 110 having a first substrate surface 112 and a second substrate surface 114. A first liquid crystal layer 120 has been disposed above the first substrate surface 112. The first liquid crystal layer 120 includes a first liquid crystalline material. The first liquid crystalline material may include one or more of cholesteric liquid crystals, nematic liquid crystals, and combinations thereof. A second liquid crystal layer 130, including a second liquid crystalline material, has been disposed above the second substrate surface 114 (on inverting the substrate layer 110 to expose the second substrate surface 114 to an operator or process equipment). The second liquid crystalline material may also include one or more of the cholesteric liquid crystals, the nematic liquid crystals, and combinations thereof.

It is further envisaged that the first liquid crystal layer 120 and the second liquid crystal layer 130 are adapted to exhibit dual color shifts, on rotation and/or translation of the security film 100. Optionally, the first liquid crystal layer 120 and the second liquid crystal layer 130 may exhibit transition from any one color to any other color.

In that manner, a user will have dual verification of the integrity of a high security paper to which the security film 100 has been employed. In several embodiments, the substrate layer 110 may made from an industrial polymer such as Polyethylene Terephthalate (PET), and the first 120 and the second 130 liquid crystal layers may be attached to the substrate layer 110 with the use of adhesives.

Figure 1C:
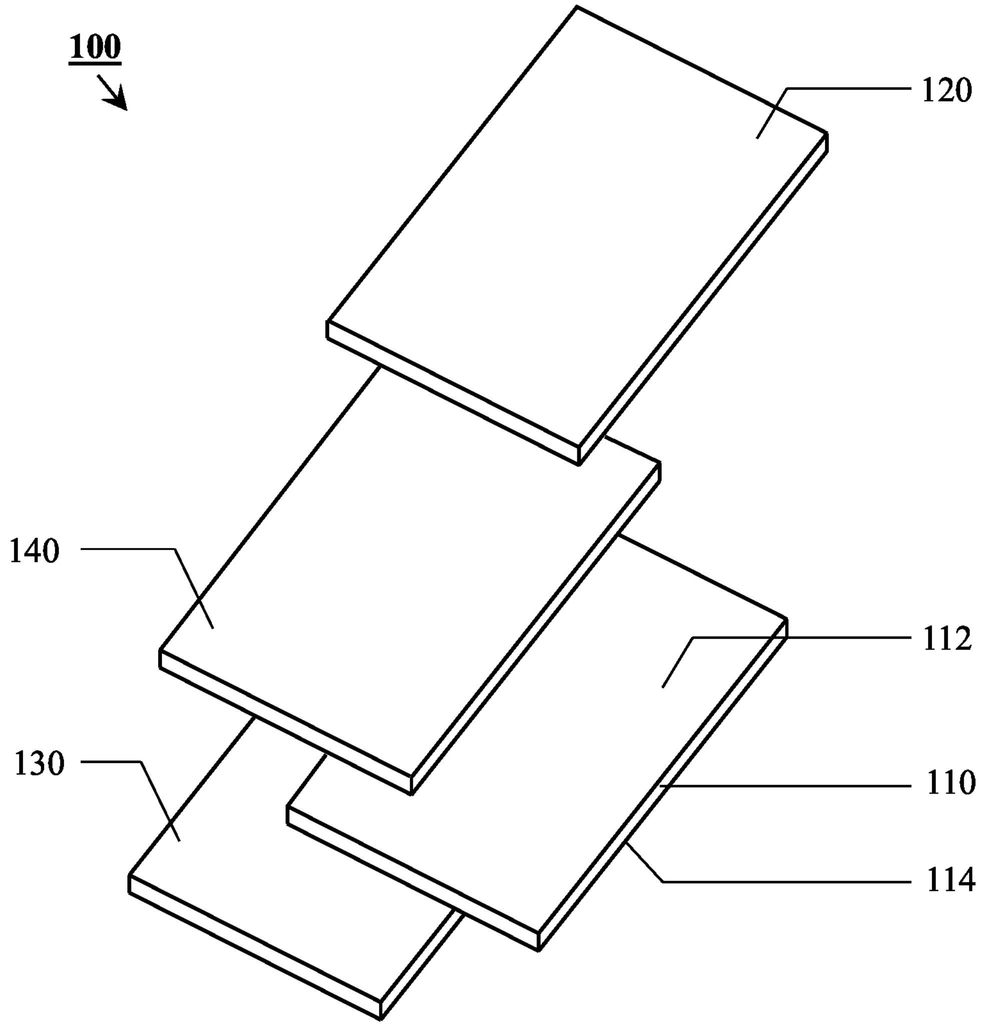
FIG. 1C illustrates an exploded view of a security film with dual color shift characteristics, in accordance with another embodiment of the present invention.
Figure 1D:
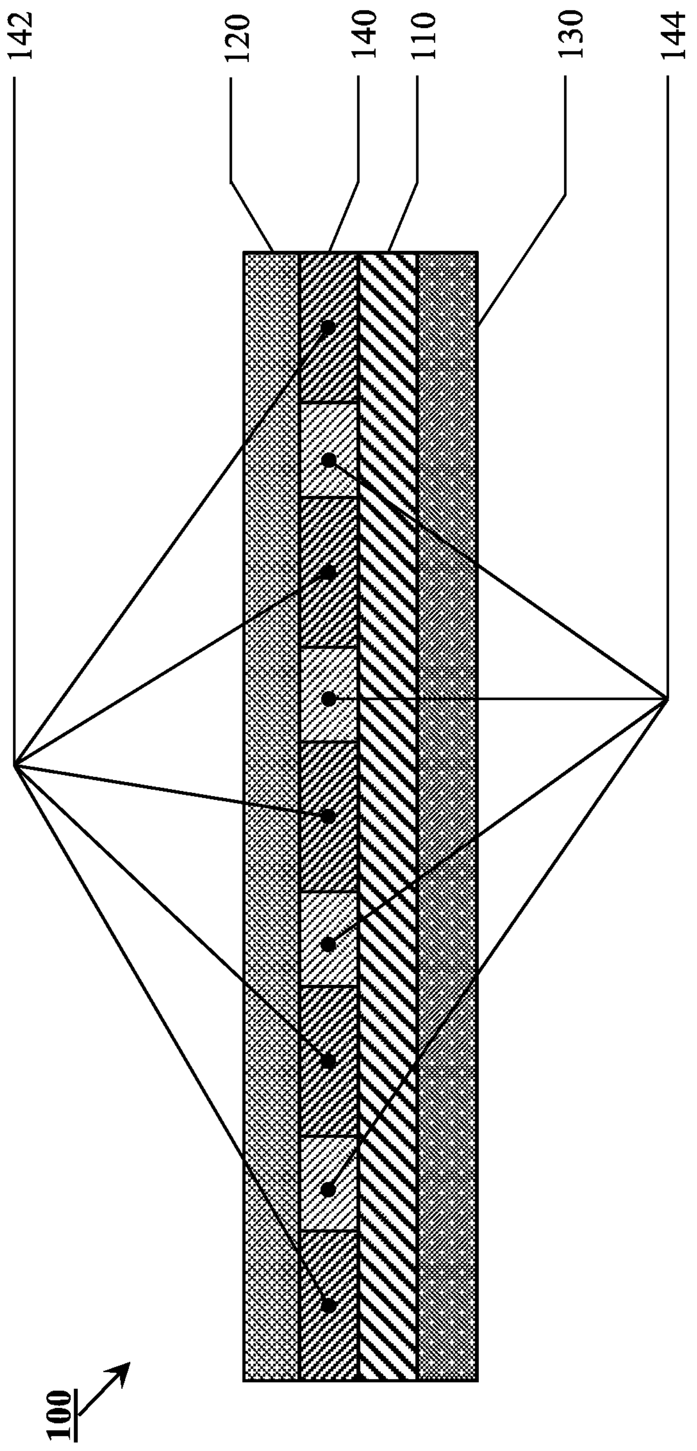

FIG. 1C illustrates an exploded view of the security film 100, in accordance with another embodiment thereof. FIG. 1D illustrates a cross-sectional view of the security film 100 of FIG. 1C. As illustrated in FIGS. 1C and ID, the security film 100 also includes a reflective coating 140 between the first liquid crystal layer 120 and the first substrate surface 112. The reflective coating 140, in several embodiments, is envisaged to be at least partially opaque in nature, in order to reflect light falling on the reflective coating 140. Further, the reflective coating 140 is envisaged to be made from a metal selected from a group consisting of Aluminum, Silver, Nickel, Platinum, Palladium, and other highly reflective metals. In several embodiments, although not bindingly, Aluminum and/or Silver may be metals of choice owing to their widespread availability and relatively low fusion temperatures. In an embodiment of the present disclosure, the first substrate surface 112 is first opaque black coated by coating with a plurality of metalized zones 142 and a plurality of demetalized zones 144. In addition, the opaque black coating forms the reflective coating 140. In another embodiment of the present disclosure, the first substrate surface 112 is coated with any other coating, which is opaque in nature. In another embodiment of the present disclosure, the first substrate surface 112 is directly coated with the first liquid crystal layer 120.

In several embodiments of the present invention, the reflective coating 140 may include the plurality of metalized zones 142 and the plurality of demetalized zones 144. The plurality of demetalized zones 144 may be created by removal or substitution of metals from certain regions of the reflective coating 140, through etching or through deposition of fused non-metallic or polymeric materials on the regions of interest. Such regions in the reflective coating 140 may be representative of identifiable indicia such as logos, emblems, alphanumeric characters, design patterns and signatures, etc.

In an embodiment of the present disclosure, the reflective coating 140 consisting of metalized and demetalized zones undergoes a drying process. In an embodiment of the present disclosure, the second substrate surface 114 is directly coated with the second liquid crystal layer 130. In an embodiment of the present disclosure, the first liquid crystal layer 120 may exhibit transition from blue to green color, when the security film 100 is tilted along a longitudinal axis, while the second liquid crystal layer 130 may exhibit transition from blue to magenta or magenta to green color. In addition, the first liquid crystal layer 120 and the second liquid crystal layer 130 facilitate dual color characteristics. In another embodiment of the present disclosure, the first liquid crystal layer 120 and the second liquid crystal layer 130 may exhibit transition from any one color to any other color.

It is also further envisaged that methods for manufacturing of the security film 100 may also be disclosed. The methods disclosed in the following discussion are envisaged to be simple and inexpensive in implementation, easily scalable, divisible within several manufacturing facilities or within several process lines within a single manufacturing facility, while also being able to be easily integrated in a single process line with the single manufacturing facility. Further, the methods of manufacturing disclosed are envisaged to deploy easily available raw materials and existing infrastructure. In an example, when the security film 100 is inserted in valuable documents, one side of the valuable document, when tilted or viewed in different angle, may change color from blue to green, whereas another side of the valuable document, when tilted may change color from blue to magenta or from magenta to green. In addition, results in providing an improved color shift security film with improved complexity.

Figure 2A:
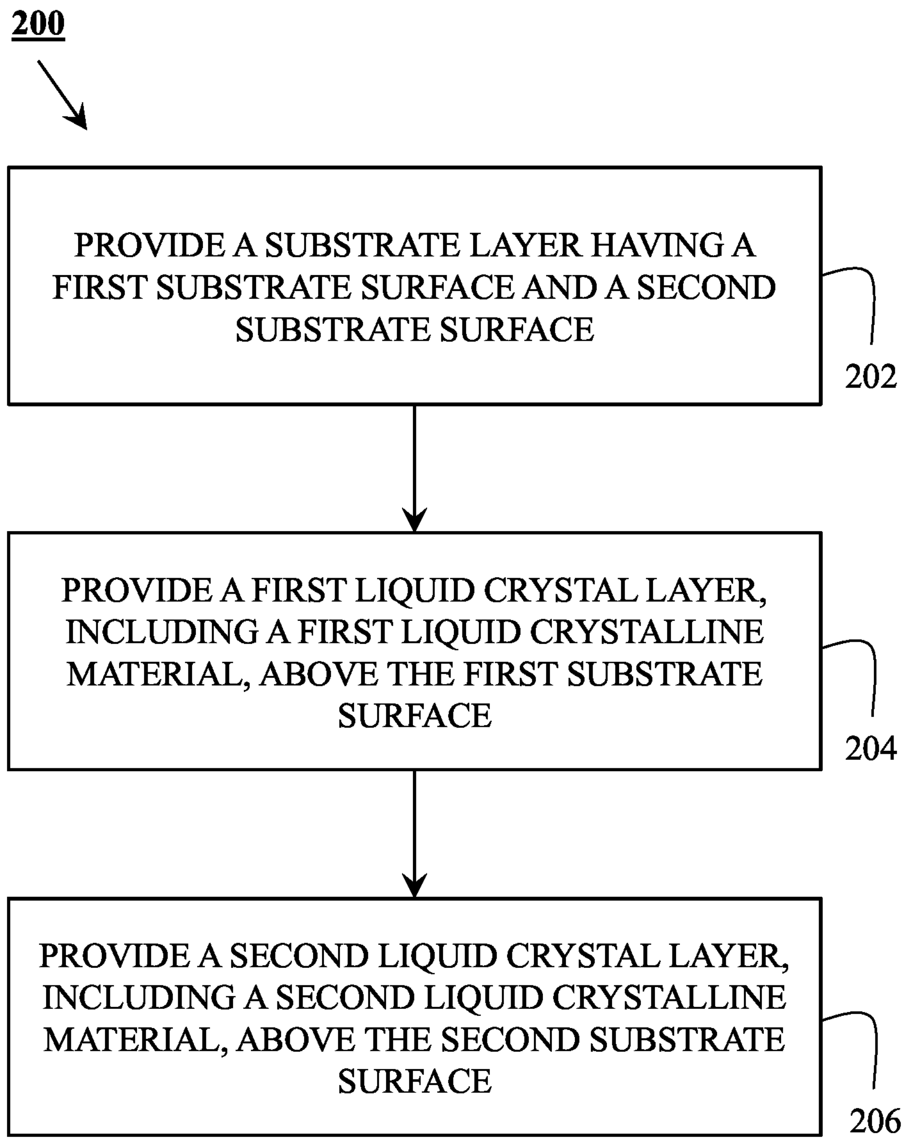
FIG. 2A illustrates a method for manufacturing the security film with dual color shift characteristics, in accordance with an embodiment of the present invention.

FIG. 2A illustrates a method 200 for manufacturing the security film 100. The method 200 begins at Step 202, where the substrate layer 110 having the first substrate surface 112 and the second substrate surface 114 is provided. At Step 204, the first liquid crystal layer 120 is attached onto the first substrate surface 112 using an adhesive. Also, at Step 206, the second liquid crystal layer 130 is attached onto the second substrate surface 114. As stated above, the first liquid crystal layer 120 and the second liquid crystal layer 130 are adapted to exhibit dual color shifts to prevent counterfeiting, on rotation and/or translation of the security film 100.

Figure 2B:
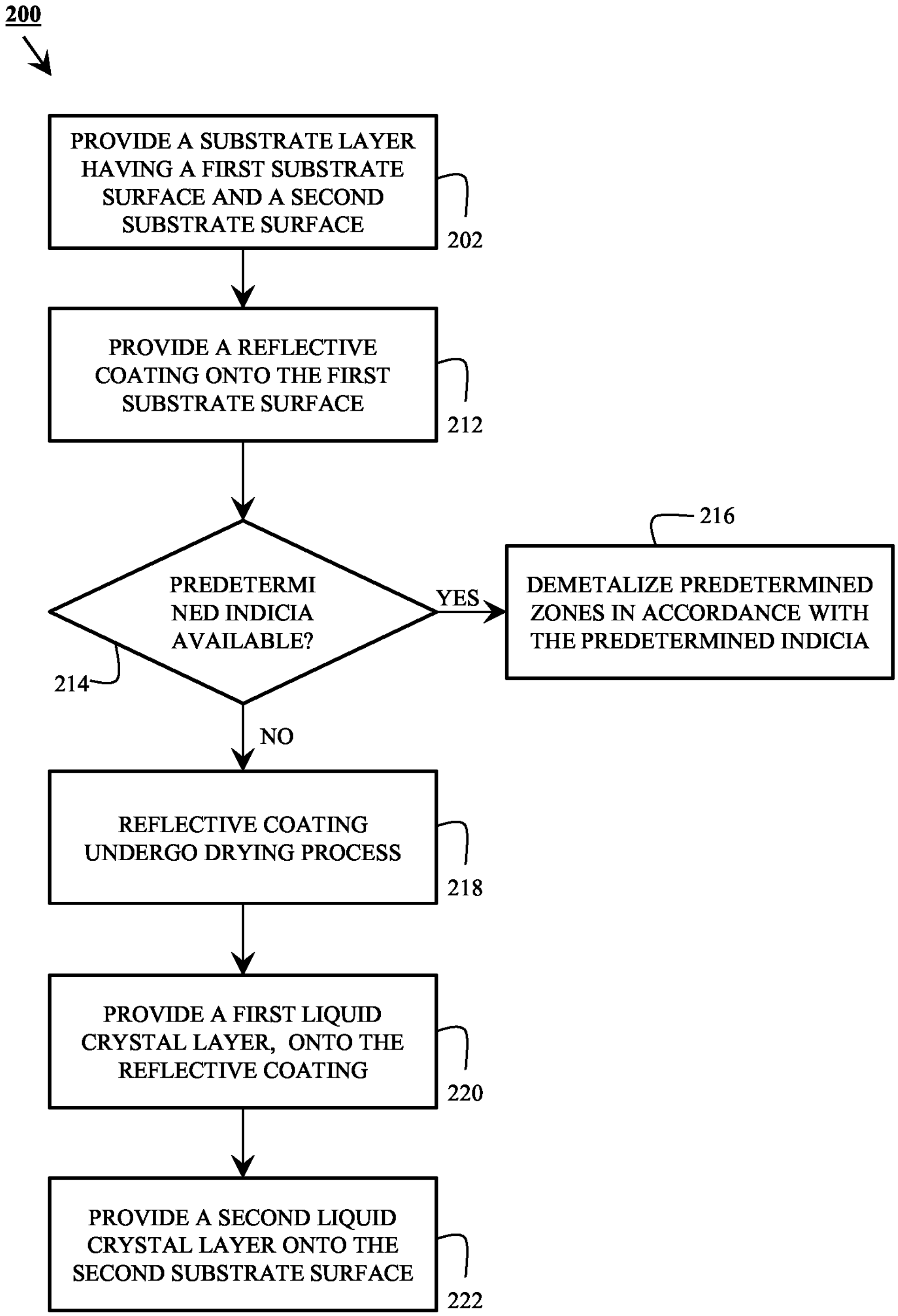
FIG. 2B illustrates a method for manufacturing a security film with dual color shift characteristics, in accordance with another embodiment of the present invention.

FIG. 2B illustrates the method 200 for manufacturing the security film 100, in accordance with another embodiment of the method. As illustrated in FIG. 2B, after Step 202, the method 200 moves to Step 212. At Step 212, the reflective coating 140 is provided onto the first substrate surface 112 through the use of adhesives. The reflective coating 140 is located between the first liquid crystal layer 120 and the first substrate surface 112. Further, at Step 214, it is confirmed if there are predetermined indicia available to be provided in or on the reflective coating 140. If the predetermined indicia are actually available, the method 200 moves to Step 216, where predetermined zones of the reflective coating 140 are demetalized in accordance with the predetermined indicia. The demetalizing step causes the generation of the plurality of metalized zones 142 and the plurality of demetalized zones 144 in the reflective coating 140.

Either following Step 214 or Step 216, the method 200 moves to Step 218. At Step 218, the reflective coating 140 undergoes a drying process. At Step 220, the first liquid crystal layer 120 is provided onto the reflective coating 140, with the use of adhesives. At Step 222, the second liquid crystal layer 130 is deposited onto the second substrate surface 114, thereby resulting in the security film 100. However, in several embodiments, as discussed below, the security film 100 may be manufactured by combining two or more independently manufactured sets of layers, thereby resulting in the security film 100.

Figure 2C:
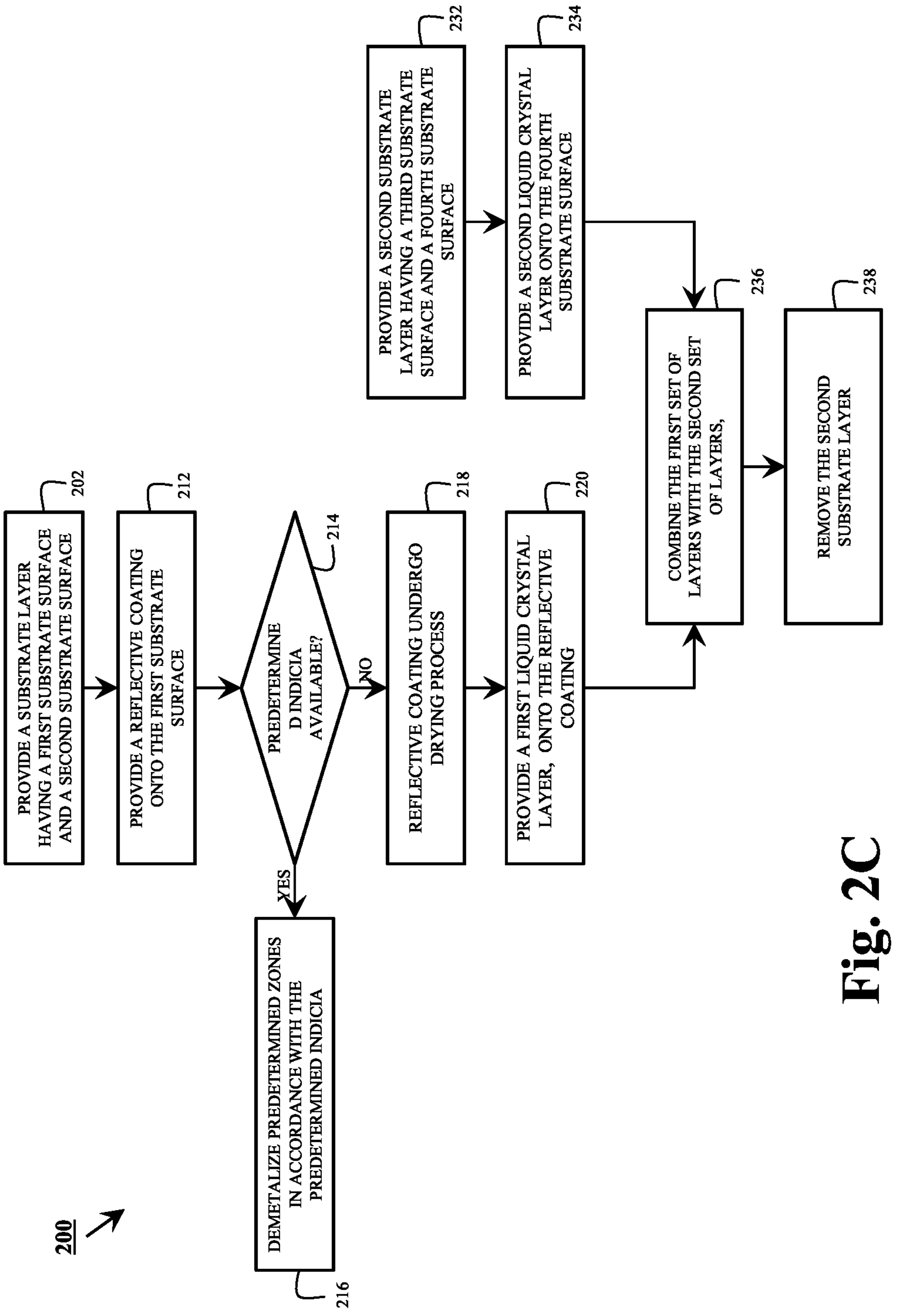
FIG. 2C illustrates a method for manufacturing a security film with dual color shift characteristics, in accordance with yet another embodiment of the present invention.
Figure 3:
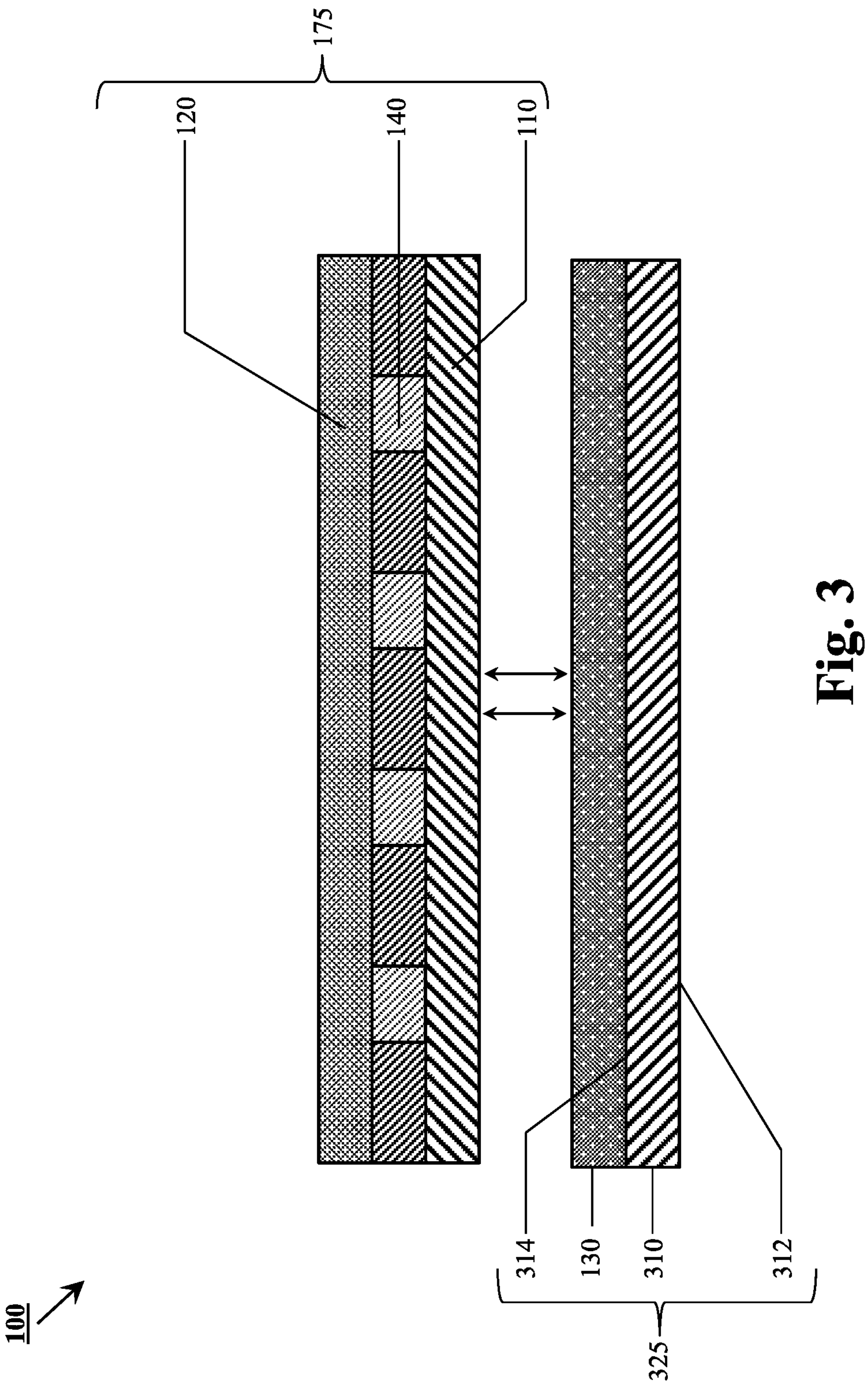
FIG. 3 illustrates a graphical representation of the method of FIG. 2C.

FIG. 2C illustrates the method 200 for manufacturing the security film 100, in accordance with yet another embodiment of the method. FIG. 3 illustrates a graphical representation of the method 200 of FIG. 2C. The method 200 as depicted through FIGS. 2C and 3 involves combination of a first set of layers 175 with a second set of layers 325. The first set of layers 175, in that regard, includes the substrate layer 110, the reflective coating 140 provided onto the first substrate surface 112, the reflective coating 140 undergo drying process, and the first liquid crystal layer 120 provided onto the reflective coating 140. The first set of layers 175 is generated by following Steps 202, 212, 214, 216 (Optionally), 218, and 220.

For generation of the second set of layers 325, at Step 232, a second substrate layer 310 having a third substrate surface 312 and a fourth substrate surface 314 is provided. In several embodiments, the second substrate layer 310 is also made up of PET or any other industrial grade polymeric material. At Step 234, the second liquid crystal layer 130 is provided onto the fourth substrate surface 314, by bonding through adhesives. At Step 236, the first set of layers 175 is combined with the second set of layers 325 by adhesion of an exposed surface of the second liquid crystal layer 130 to the second substrate surface 114, in a manner, that the third substrate surface 312 is facing away from the first set of layers. At Step 238, after combining the first set of layers 175 with the second set of layers 325, the second substrate layer 310 is removed to yield the security film 100.

The claimed invention as described above through embodiments discussed above, provides problem solving approach and offer several advantages. For example, when such a security film is inserted in valuable documents, one side of the currency when tilted or viewed in a different angle, may change color from blue to green, whereas another side of the currency when tilted or viewed in a different angle, may change color from blue to magenta or from magenta to green. This results in providing an improved color shift security film with improved complexity. Optionally additional security features, consisting of one or more coatings with fluorescent colors on either side or both the sides of the security film, shall permit optimal recognition of the optically variable effect when used as security film in valuable notes, such that when the currency is tiled or viewed in a different angle, both the side of the currency will show different color shift effect.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope consistent with the principles and the novel and inventive features disclosed or suggested herein. Accordingly, the invention is anticipated to hold on to all other such alternatives, modifications, and variations that fall within the scope of the present invention and appended claims.

I claim:

1. A security film with dual color shift characteristics, the security film comprising:

a substrate layer having a first substrate surface and a second substrate surface;

a first liquid crystal layer, including a first liquid crystalline material, disposed on the first substrate surface; and a second liquid crystal layer, including a second liquid crystalline material, disposed on the second substrate surface, wherein the first liquid crystal layer and the second liquid crystal layer are adapted to exhibit dual color shifts to prevent counterfeiting, on rotation and/or translation of the security film; and, a reflective coating between the first liquid crystal layer and the first substrate surface.

2. The security film as claimed in claim 1, wherein the reflective coating includes a plurality of metalized zones and a plurality of de metalized zones.

3. A method for manufacturing a security film with dual color shift characteristics, the method comprising steps of:

providing a substrate layer having a first substrate surface and a second substrate surface opposite said first substrate surface, wherein the first substrate surface is coated by opaque black coating with a plurality of metalized zones and a plurality of demetalized zones, wherein the opaque black coating over the first substrate surface forms a reflective coating;

drying the opaque black coating applied over the first substrate surface;

providing a first liquid crystal layer, including a first liquid crystalline material, over the opaque black coating, wherein the first liquid crystal layer exhibits dual color shifts on the first substrate surface of two different color; and providing a second liquid crystal layer, including a second liquid crystalline material, over the second substrate surface, such that said first and second liquid crystal layers are disposed on opposite sides of said substrate layer, wherein the second liquid crystal layer exhibits dual color shifts on the second substrate surface of two different color, wherein the first liquid crystal layer and the second liquid crystal layer are adapted to exhibit dual color shifts to prevent counterfeiting, on rotation and/or translation of the security film.

4. The method as claimed in claim 3, wherein the reflective coating is made from a metallic material.

5. The method as claimed in claim 3, comprising step of demetalizing predetermined zones of the reflective coating to generate a plurality of metalized zones and a plurality of demetalized zones in the reflective coating.

6. The method as claimed in claim 3, wherein the manufacturing of the security film includes combining a first set of layers with a second set of layers, such that:

the first set of layers includes the substrate layer, the reflective coating provided onto the first substrate surface, and the first liquid crystal layer provided onto the reflective coating;

the second set of layers includes a second substrate layer having a third substrate surface and a fourth substrate surface, and the second liquid crystal layer provided onto the fourth substrate surface; and wherein the first set of layers and the second set of layers have been manufactured independently, wherein, the first set of layers is combined with the second set of layers by joining an exposed surface of the second liquid crystal layer to the second substrate surface, in a manner, that the third substrate surface is externally facing, wherein the second substrate layer is removed to yield the security film, after combining the first set of layers with the second set of layers.

7. A method for manufacturing a security film with dual color shift characteristics, the method comprising steps of:

providing a substrate layer having a first substrate surface and a second substrate surface, wherein the first substrate surface is coated by opaque black coating with a plurality of metalized zones and a plurality of demetalized zones, wherein the opaque black coating over the first substrate surface forms a reflective coating;

drying the opaque black coating applied over the first substrate surface;

providing a first liquid crystal layer, including a first liquid crystalline material, above the first substrate surface, wherein the first liquid crystal layer exhibits dual color shifts on the first substrate surface of two different color; and providing a second liquid crystal layer, including a second liquid crystalline material, above the second substrate surface, wherein the second liquid crystal layer exhibits dual color shifts on the second substrate surface of two different color, wherein the first liquid crystal layer and the second liquid crystal layer are adapted to exhibit dual color shifts to prevent counterfeiting, on rotation and/or translation of the security film; and providing the reflective coating between the first liquid crystal layer and the first substrate surface.

* * * * *